US009888070B2

(12) United States Patent
McGregor et al.

(10) Patent No.: US 9,888,070 B2
(45) Date of Patent: Feb. 6, 2018

(54) BROKERED ADVANCED PAIRING

(71) Applicant: MICROSOFT TECHNOLOGY LICENSING, LLC, Redmond, WA (US)

(72) Inventors: Benjamin Scott McGregor, Redmond, WA (US); Niket Ashok Sanghvi, Seattle, WA (US); Samuel David Adams, Bellevue, WA (US); Nabil Fates, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 227 days.

(21) Appl. No.: 14/754,533

(22) Filed: Jun. 29, 2015

(65) Prior Publication Data
US 2016/0381135 A1 Dec. 29, 2016

(51) Int. Cl.
*G06F 15/16* (2006.01)
*G06F 15/173* (2006.01)
*H04L 29/08* (2006.01)
*H04L 29/06* (2006.01)
*G06F 21/44* (2013.01)
*G06F 21/53* (2013.01)

(52) U.S. Cl.
CPC ........ *H04L 67/1068* (2013.01); *G06F 21/445* (2013.01); *G06F 21/53* (2013.01); *H04L 63/10* (2013.01); *H04L 67/125* (2013.01); *H04L 69/18* (2013.01)

(58) Field of Classification Search
CPC ... H04L 67/1068; H04L 63/10; H04L 67/125; H04L 69/18; G06F 21/445; G06F 21/53

USPC ........................................................ 709/229
See application file for complete search history.

(56) References Cited

U.S. PATENT DOCUMENTS

| 8,650,399 | B2 * | 2/2014 | Le Bihan | G06F 21/445 |
| | | | | 705/67 |
| 8,839,389 | B2 * | 9/2014 | Cohen | H04L 63/061 |
| | | | | 455/41.1 |
| 9,070,282 | B2 * | 6/2015 | Clough | G06F 19/3418 |
| 9,225,742 | B2 * | 12/2015 | Stuntebeck | H04L 63/06 |
| 9,450,962 | B2 * | 9/2016 | Longhorn | H04L 43/50 |
| 9,560,425 | B2 * | 1/2017 | Harrison | H04L 63/10 |
| 9,577,999 | B1 * | 2/2017 | Lindemann | H04L 29/06 |
| 9,578,182 | B2 * | 2/2017 | Raleigh | H04M 15/723 |
| 9,602,328 | B2 * | 3/2017 | Mundhra | H04L 63/06 |
| 9,609,020 | B2 * | 3/2017 | White | H04L 63/20 |
| 9,628,949 | B2 * | 4/2017 | Moldavsky | H04W 4/02 |
| 2009/0031967 | A1 | 2/2009 | Banas et al. | |

(Continued)

OTHER PUBLICATIONS

"International Search Report and Written Opinion Issued in PCT Application No. PCT/US2016/039462", dated Sep. 13, 2016, 12 Pages.

(Continued)

*Primary Examiner* — Melvin H Pollack

(57) ABSTRACT

Examples described herein provide advanced pairing between an application and a selected device within an application-driven user experience. An application is enabled to pair devices within the application context and customize the user experience without relying on an experience or user interface provided by an operating system. This application-driven pairing is abstracted from protocols, allowing the application to provide custom pairing user experiences for any protocol.

20 Claims, 10 Drawing Sheets

(56) References Cited

U.S. PATENT DOCUMENTS

| | | |
|---|---|---|
| 2009/0240814 A1 | 9/2009 | Brubacher et al. |
| 2012/0083208 A1 | 4/2012 | Giles et al. |
| 2012/0147825 A1 | 6/2012 | Hassan et al. |
| 2013/0067531 A1 | 3/2013 | Morris et al. |
| 2013/0169550 A1 | 7/2013 | Gal et al. |
| 2013/0318158 A1 | 11/2013 | Teng et al. |
| 2014/0143137 A1* | 5/2014 | Carlson ............... G06Q 20/02 705/39 |
| 2014/0195690 A1 | 7/2014 | Harrison et al. |
| 2014/0222700 A1* | 8/2014 | Galligan ............... G06Q 30/02 705/319 |
| 2014/0235166 A1 | 8/2014 | Molettiere et al. |
| 2015/0006761 A1 | 1/2015 | Miller et al. |
| 2015/0095933 A1 | 4/2015 | Blackburn et al. |
| 2016/0094664 A1* | 3/2016 | Olcese ............... G06F 8/31 709/225 |
| 2016/0277930 A1* | 9/2016 | Li ............... H04L 41/28 |
| 2016/0285628 A1* | 9/2016 | Carrer ............... H04L 9/3228 |
| 2016/0309323 A1* | 10/2016 | Zarakas ............... H04W 12/06 |
| 2016/0315922 A1* | 10/2016 | Chew ............... H04L 63/061 |
| 2016/0342784 A1* | 11/2016 | Beveridge ............... H04L 67/16 |
| 2016/0344710 A1* | 11/2016 | Khan ............... H04L 63/0492 |
| 2016/0344745 A1* | 11/2016 | Johnson ............... H04L 67/34 |
| 2017/0105189 A1* | 4/2017 | Foti ............... H04W 60/00 |
| 2017/0118645 A1* | 4/2017 | Zarakas ............... H04W 12/06 |

OTHER PUBLICATIONS

Wojtek, et al., "Bump", Published on: Jun. 10, 2011, 5 pages. Available at: http://blog.paylane.com/bump-useful-technology-or-another-redundant-service/

Miera, Jordan., "How to Pair YouTube on a Mobile Device to a TV without Chromecast", Published on: Sep. 22, 2014, 12 pages. Available at: http://www.androidcentral.com/pairing-youtube-mobile-device-tv-without-chromecast.

Delessio, Carmen., "Why It's Time to Start Developing Apps for Google TV", Published on: Feb. 18, 2013, 9 pages. Available at: http://www.informit.com/articles/article.aspx?p=2021960.

"Superbeam", Published on: Nov. 26, 2013, 10 pages. Available at: http://superbe.am/.

"Tekcafe", Published on: Nov. 1, 2014, 7 pages. Available at: http://www.tekcafe.com/technology/genius-home-automation-smartthings/.

Saxena, et al., "Automated Device Pairing for Asymmetric Pairing Scenarios", In Proceedings of 10th International Conference on Information and Communication Security, Oct. 20, 2008, 16 pages.

Miettinen, et al., "Context-Based Zero-Interaction Pairing and Key Evolution for Advanced Personal Device", In Proceedings of the ACM SIGSAC Conference on Computer and Communications Security, Nov. 3, 2014, 12 pages.

Antikainena, et al., "Commitment-based Device-Pairing Protocol with Synchronized Drawings and Comparison Metrics", In Proceedings of Pervasive and Mobile Computing, vol. 16, Part B, Jan. 2015, 15 pages.

"Second Written Opinion Issued in PCT Application No. PCT/US2016/039462", dated Jun. 7, 2017, 9 Pages.

"International Preliminary Report on Patentability Issued in PCT Application No. PCT/US2016/039462", dated Sep. 14, 2017, 10 Pages.

* cited by examiner

BROKERED ADVANCED PAIRING

BACKGROUND

Some applications running on a computing device may be allowed to use other devices if the other devices have a secure relationship with the computing device. Establishing a secure relationship between a computing device and other devices, often referred to as pairing a device, is typically an experience driven by the operating system of the computing device, often using a system-owned user interface to provide the user experience.

SUMMARY

Examples of the disclosure provide a system for brokered pairing between untrusted applications and devices while maintaining a user experience within an application-context. Aspects of the disclosure provide a device broker that receives a pairing request from an application, including a selected device, and facilitates device pairing operations for the application and the selected device via an application-driven user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure provide for advanced pairing between an untrusted application and a selected device within an application-driven user experience. As described herein, advanced pairing refers to in-application pairing where the application has control of the pairing ceremony and user interface, as opposed to basic pairing where the app initiates pairing but the pairing ceremony and user interface are controlled by the operating system. In some examples, an application is enabled to pair devices within the application context and customize the user experience without relying on an experience or user interface provided by an operating system. In other examples, the application may obtain the pairing security data from non-user sources and execute the ceremony without user input. Additionally, aspects of the disclosure provide this pairing capability to an untrusted application abstracted from the protocol, allowing the untrusted application to provide custom pairing user experiences for any protocol. As used herein, an untrusted application refers to an application that is sandboxed, or not privileged to perform system-level operations. For example, an application obtained from an application store may be an untrusted application.

Aspects of the disclosure provide a broker component that is privileged to enforce policies and perform system operations, such as pairing operations with devices, on behalf of an untrusted application. The untrusted application, or sandboxed application, is able to perform some privileged operations outside of the sandbox via the broker component. The broker component facilitates pairing operations between the untrusted application and a device via a unified framework that handles device protocols, allowing discovering and pairing operations over all protocols to behave in a unified way. Some examples provide a user consent user interface that may be invoked by the broker component if user consent is desired before allowing the application to pair with a particular device, or if user consent is desired to un-pair a device, for example.

Examples of the disclosure provide a user experience that maintains an application context from a user perspective, with an application-driven pairing user interface that may be customized for the application or the user, or both. As a result, these examples improve performances perceived by the user interacting with the computing device as the application drives the pairing experience by allowing the user to maintain their work flow without removing the user from the application context.

Figure 1:
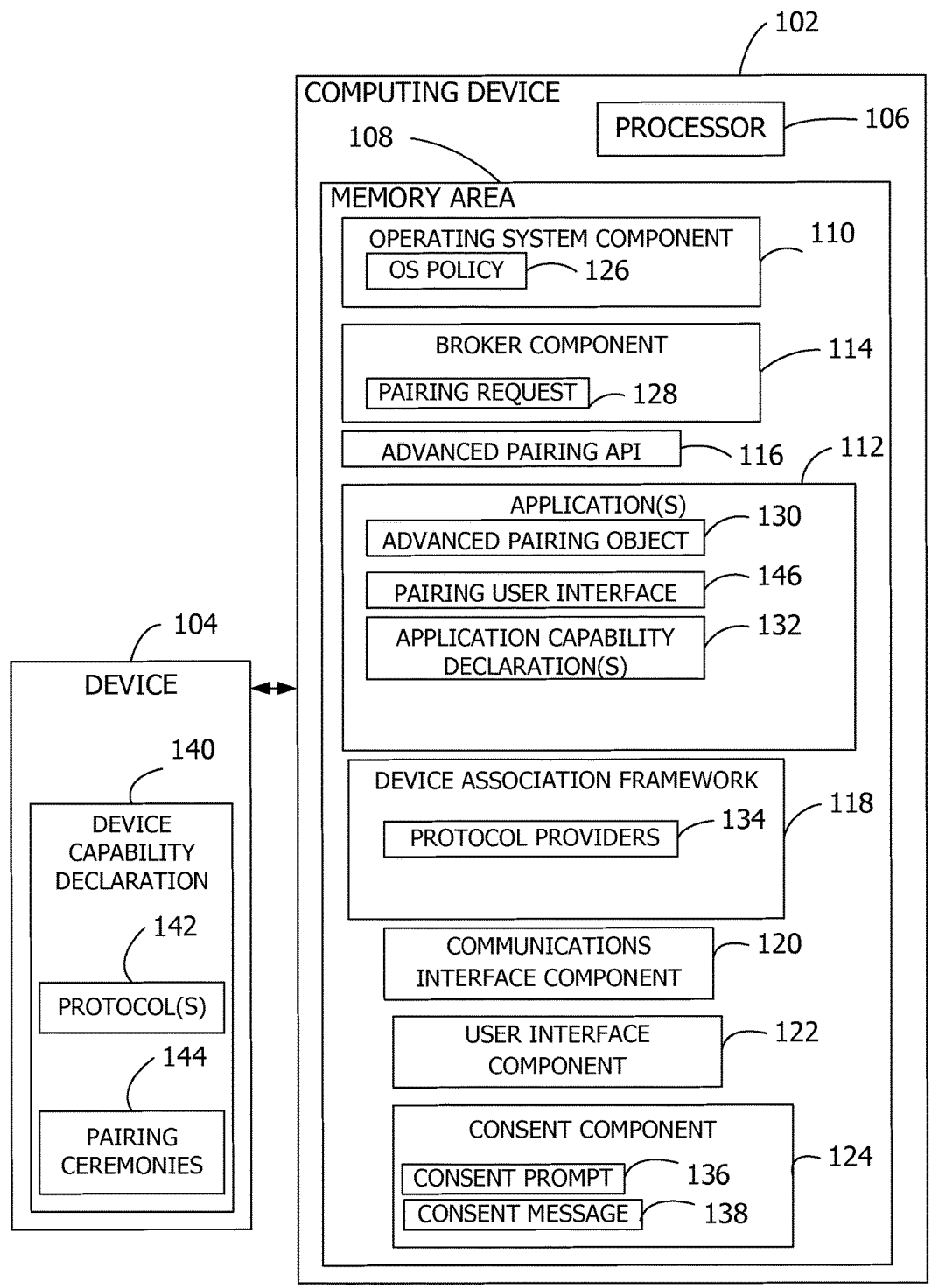
FIG. 1 is an exemplary block diagram illustrating a computing device for brokered advance pairing.

Referring now to FIG. 1, an exemplary block diagram illustrates a computing device for brokered advanced pairing. In the example of FIG. 1, the computing device represents a system for pairing the computing device with another device and providing a pairing user experience that maintains an in-application context and is driven by the application. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, wearable device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device may have at least one processor and a memory area. In some examples the computing device may also include at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 4-5).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include mail application programs, web browsers, calendar application programs, address book application programs, messaging programs, communication applications, media applications, location-based services, search programs, productivity applications, and the like. The applications may communicate with counterpart applications or services such as web services accessible via a network. For example, the applications may represent downloaded client-side applications that correspond to server-side services executing in a cloud.

The memory area further stores one or more computer-executable components. Exemplary components include a communications interface component, a user interface component, a broker component, and a consent component. The user interface component, when executed by the processor of the computing device, causes the processor to output data to the user interface component and process user input received via the user interface component.

In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

Referring again to FIG. 1, an exemplary block diagram illustrates a computing device for providing an advanced pairing in-application user experience. Computing device 102 and device 104 may represent devices capable of establishing a secure relationship, or being paired. Computing device 102 may include a mobile computing device or any other portable device. In some examples, the mobile computing device includes a mobile telephone, laptop, tablet, computing pad, netbook, gaming device, wearable device, and/or portable media player. Computing device 102 may also include less portable devices such as desktop personal computers, kiosks, tabletop devices, industrial control devices, wireless charging stations, and electric automobile charging stations. Additionally, computing device 102 may represent a group of processing units or other computing devices.

Computing device 104 may be any type of device capable of being paired with computing device 102, including, without limitation, a wireless device, network protocol device, Internet of Things (IoT) device, WiFi Direct device, transient device, or any other suitable device. As used herein, a transient device may refer to a device configured to connect with another device without authentication through pairing and forget the other device once disconnected. A device may temporarily pair with another device, connect, and un-pair once disconnected to achieve transience, for example. In some examples, a transient device may un-pair computing device 102 automatically in response to computing device 102 terminating use of the transient device.

Computing device 102 includes processor 106, which may be communicatively coupled to memory area 108. Memory area 108 may include operating system component 110, application(s) 112, broker component 114, advanced pairing application programming interface (API) 116, device association framework 118, communications interface component 120, user interface component 122, and consent component 124.

Operating system component 110 may include operating system (OS) policy 126. OS policy 126 may control which applications have the ability to perform advanced pairing. For example, OS policy 126 may allow advanced pairing operations if a specific advanced pairing capability is declared by a given application. As another example, OS policy 126 may include an enterprise policy, which may block all applications from performing advanced pairing. Other illustrative examples of OS policy 126 may include, without limitation, a policy allowing one type of protocol but blocking other types of protocols, a policy allowing or blocking specific untrusted applications from an application store, a policy allowing or blocking an application based on how the application is loaded into the system, a policy allowing or blocking an application based on the publisher of that application and which device it is attempting to pair, a custom policy, or any other suitable policy. In an illustrative example, a policy may allow a fitness-based application to always pair with its corresponding wearable device. OS policy 126 may be incorporated into the operating system, updated via patches or through automatic updates, and/or customized through management tools, for example. Application(s) 112 may include application capability declaration(s) 128. Individual applications may have their own application capability declaration, which include the specific device types the application may pair with or services the application is capable of providing, for example.

In some examples, application capability declarations may be referred to as application extensions.

Application(s) 112 may be one or more untrusted applications capable of being executed by processor 106 in a sandbox and configured to initiate and control a pairing experience outside the sandbox environment via a system broker, such as broker component 114. In some examples, application(s) 112 may be downloaded from an application store, and may be third-party applications or unverified programs. Application(s) 112 may be configured to control the pairing ceremony and experience, including the user interface, within the application context or framework. By allowing an application to control the pairing experience and user interface, the examples provided herein provide a user experience that remains within an application context, rather than having an operating system control the pairing experience and user interface and disrupting the user experience relating to the application.

Additionally, application(s) 112 may control the pairing experience in a way that is abstracted from the protocol, such that an application does not have to have specific knowledge about each protocol the application wants to use in a pairing experience. This ability is provided in a protocol agnostic way that supports all protocols that the operating system supports using broker component 114 to facilitate the pairing on behalf of application(s) 112 and device association framework 118 to handle the protocols involved, as described in more detail below.

In some examples, when application(s) 112 desires to implement a pairing experience with a device, such as device 104, application(s) 112 creates pairing request 128, calls advanced pairing API 116, and sends pairing request 128 to broker component 114 via advanced pairing API 116. Pairing request 128 may include advanced pairing object 130, which is an application object that may include, without limitation, the type(s) of device the application wants to pair and device identification information associated with a targeted device that the application is attempting to pair. Advanced pairing API 116 may use the information from advanced pairing object 130 to determine if the device targeted for pairing is available for advanced pairing, in some examples. In these examples, a device discovery list may be passed to the advanced pairing API by the operating system, for use in determining if the targeted device is eligible for pairing. If the targeted device is not eligible for pairing, advanced pairing API 116 returns an error message to application(s) 112. If the targeted device is eligible for pairing, advanced pairing API 116 passes pairing request 128 on to broker component 114.

Broker component 114 may enforce policy, and broker and manage pairings for untrusted applications across all protocol types in a protocol agnostic way via device association framework 118. In some examples, broker component 114 may be a system component configured to enforce system policy and perform system-level operations, such as device pairing. In other examples, broker component 114 may be a system service having system-granted privilege to perform system-level operations, such as device pairing. In these examples, broker component 114 may initiate a broker process between untrusted applications and devices in a normal operating system environment—outside a sandbox—and enforces applicable policies while allowing the untrusted application to drive the pairing process and user experience. Whereas application(s) 112 may execute within a sandbox environment, without full system privileges, broker component 114 operates outside the sandbox and has system-level privileges, which provides application(s) 112 the ability to perform some privileged operations, such as pairing, via broker component 114.

By facilitating advanced pairing operations for application(s) 112 behind the scenes, broker component 114 allows application(s) 112 to maintain control over the device pairing ceremonies, as well as the user experience. Broker component 114 receives pairing request 128 and determines whether advanced pairing operations with the targeted device are permitted for application(s) 112. If the requesting application is ultimately granted access to perform the advanced pairing with the targeted device, broker component 114 may return advanced pairing object 130 to application(s) 112 via advanced pairing API 116, including information for continuing advanced pairing operations.

Broker component 114 may access or obtain OS policy 126 to determine if application(s) 112 have the ability to perform advanced pairing, or have the ability to perform advanced pairing with a specific device, in some examples. Broker component 114 may access or obtain application capability declaration(s) 132 to determine if a specific advanced pairing capability is declared for the requesting application, in some examples. For example, application capability declaration(s) 132 may provide information associated with that application pertaining to types of devices the application can pair, type of services that application provides, types of pairing ceremonies the application handles, and other information, any of which may factor into the decision process for broker component 114. Broker component 114 may also query the targeted device identified in pairing request 128, such as device 104 for example, via device association framework 118.

Device association framework 118 is a framework and operating system service configured to pair devices for computing device 102. Device association framework 118 provides an abstraction layer to clients, such as application(s) 112, so that discovering and pairing devices over all protocols behaves in a unified manner on computing device 102. In these examples, device association framework 118 includes protocol providers 134. Protocol providers 134 include actual protocol-specific plugins that enable device association framework 118 to support various communication protocols, such as, without limitation, Bluetooth®, WiFi Direct, Universal Plug and Play (UPnP), Web Services on Devices (WSD), near filed communication (NFC), and any other applicable communication protocol.

Broker component 114 may query device 104 via device association framework 118 to identify device capability declaration 140. Device capability declaration 140 may be a collection of device property information in these examples. Device capability declaration 140 may include information such as, without limitation, protocol(s) 142, pairing ceremonies 144, device address, signal strength, pairing state, and any other device-specific information. Protocol(s) 142 may include the communication protocol or protocols supported by device 104, as well as the associated protocol-specific parameters for each supported protocol, in these examples. Pairing ceremonies 144 may be the actual types of pairing ceremonies supported by device 104. Pairing ceremonies may include, for example, without limitation, push-button, numeric compare, personal identification number (PIN) entry, PIN compare, PIN display, JustWorks, or any other suitable pairing ceremony, including custom pairing ceremonies initiated by an application, such as application(s) 112.

In these examples, pairing is a separate operation from device discovery. Once an application has discovered a device, the application may pair the device using brokered pairing, if allowed. Device association framework 118 includes APIs for all pairing steps, and broker component 114 may use APIs provided by device association framework 118 on behalf of the requesting application, for example. In one illustrative example, broker component 114 knows the pairing ceremonies a discovered device supports, yet rather than providing that information to the requesting application, broker component 114 may instead match the device supported ceremonies against the pairing ceremonies provided by the requesting application. In these examples, the requesting application may specify a minimum protection level for pairing, such as requiring encryption or authentication for example.

The broker component may check the given policy for the system, user, and the requesting application, and base the pairing request decision on one or more of the application capability declaration, the specific device type targeted in the pairing request, the type of service provided by the application and optionally indicated in the pairing request, the device capability declaration, enterprise group policy, OS policy, or other policies. Optionally, if broker component 114 determines further user confirmation is needed, broker component 114 may also invoke consent component 124.

Consent component 124 may provide user consent prompt 136 via user interface component 122 to obtain user input. In an exemplary scenario where broker component 114 invokes consent component 124 to provide a user consent prompt, consent component 124 may determine whether user input received in response to user consent prompt 136 allows or denies the advanced pairing operations. Consent component 124 may pass consent message 138 to broker component 114 indicating the result of received user input for broker component 114 to use in determining whether advanced pairing operations will be allowed. Broker component 114 may invoke consent component 124 based on a policy, such as a user policy or enterprise policy, for example.

Application(s) 112 receives advanced pairing object 130 back from broker component 114 as a result of application(s) 112 being granted access to perform the requested advanced pairing operations with the selected device. Advanced pairing object 130 may include the protocol(s) and list of ceremonies supported by the selected device, which application(s) 112 may choose from in order to manage the pairing ceremony and provide a custom user experience for device pairing. In an illustrative example, where device 104 is the selected device for pairing by application(s) 112, advanced pairing object 130 may include pairing ceremonies 144, the actual pairing ceremonies supported by device 104. In this example, application(s) 112 may select a ceremony from pairing ceremonies 144 and manage the pairing ceremony. Application(s) 112 may optionally use advanced pairing object 130 to generate pairing user interface 146 to further manage the pairing experience within the application context, maintaining the user experience within the application context. Pairing user interface 146 may be used to obtain pairing security data to complete the pairing ceremony, in some examples. Application(s) 112 may complete the selected pairing ceremony and being using the selected device immediately.

In some examples, if a requesting application does not recognize any of the available ceremonies returned in the list of ceremonies supported by the device, the broker component or service may query other applications to determine if another application knows one or more of the ceremonies supported by the device to be paired. If another application knows a ceremony from the list of pairing ceremonies, the broker component may use the pairing data for that ceremony from the other application to facilitate the pairing operations for the requesting application. In other examples, broker component 114 may include logic for determining which application to use for pairing based on the pairing ceremonies supported by that application, or the types of devices supported by that application, or logic for defining device support using arbitrary filters based on device property information. For example, a publisher may include a definition within an untrusted application manifest that indicates the untrusted application should manage pairing for all devices corresponding to the same brand, or originating from a corresponding manufacturer, as the application publisher. Applications may register with the operating system of computing device 102 to identify types of devices and pairing ceremonies an application is configured to handle. The operating system component may maintain a register of applications, including data on the device and ceremony types individual applications recognize or are configured to pair. In an illustrative example, a requesting application initiates pairing with a target device, but does not know the ceremony returned by the target device. In this example, the broker component may query the OS register of applications to determine which application, if any, knows the ceremony and use pairing data from that application to complete the pairing ceremony.

Communications interface component 120 may be used to establish or maintain, or both establish and maintain, a connection between computing device 102 and device 104, in these examples. In some examples, user interface component 122 may project or stream a user interface of computing device 102 to a display of device 104.

The illustrative examples provided herein provide applications with increased control over the pairing experience, as well as the ability to provide a more consistent and customizable pairing experience for a user. Applications are able to pair devices using custom user interfaces controlled by the application, providing the capability for more innovative and exotic customized pairing ceremonies, such as quick response (QR) code scanning, pairing over cloud computing, via sound waves, and the like.

Figure 2:
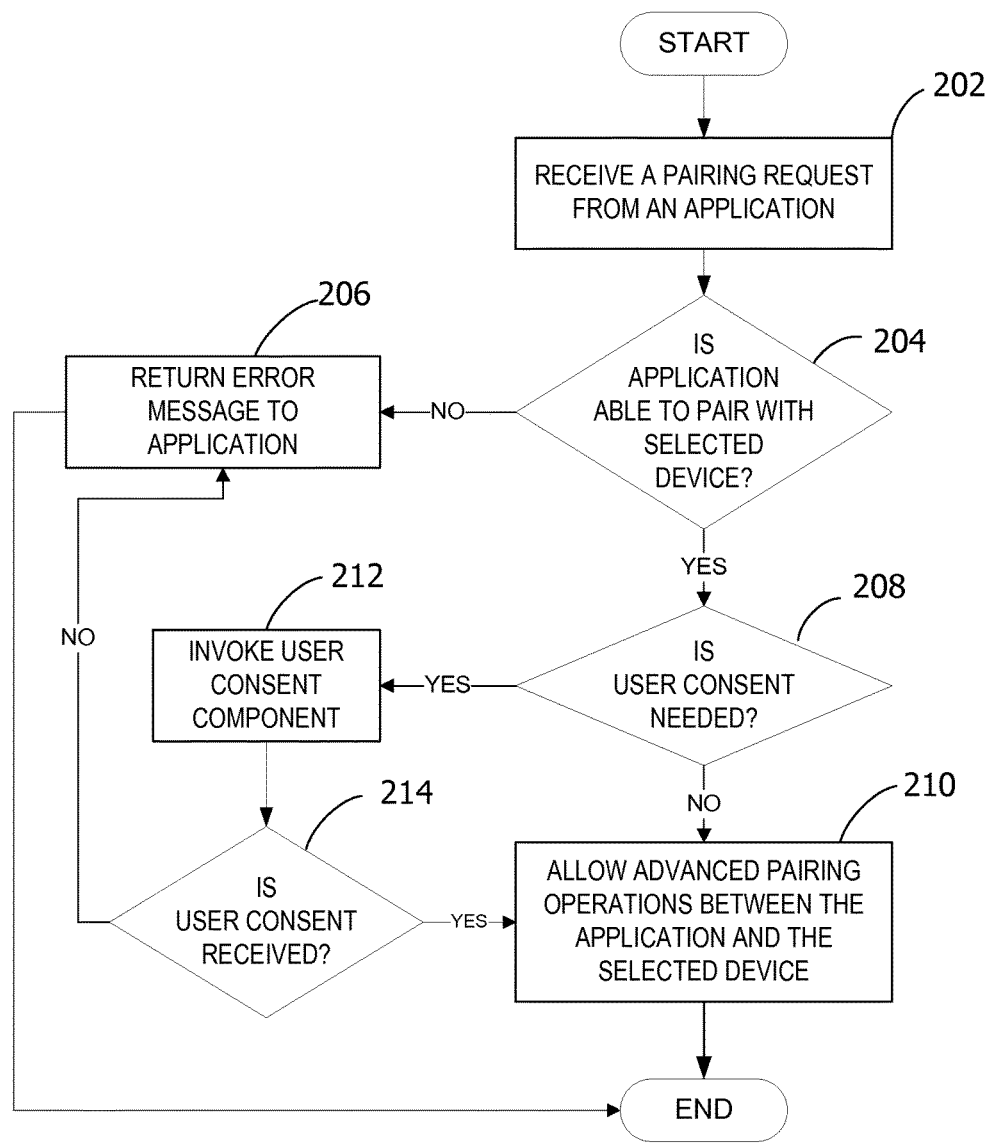
FIG. 2 is an exemplary flowchart illustrating operations performed by the broker component implemented on a computing device.

Referring now to FIG. 2, an exemplary flowchart illustrating operations performed by the broker component or broker service implemented on a computing device is described. These operations may be performed by a broker component, such as broker component 114 in FIG. 1, for example.

The process begins by receiving a pairing request from an application at operation 202. The received pairing request may include an advanced pairing object in some examples. The process determines if the application is able to pair with the selected or targeted device at operation 204. This determination may be based on a given policy or policies, such as, without limitation, operating system policies, application policies, device policies, application capabilities, device capabilities, group enterprise policy, and/or any other suitable policy.

In response to the process determining that the application is not able to pair with the selected device, the operation returns an error message to the application at operation 206, with the process terminating thereafter. In response to the process determining that the application is able to pair with the selected device, the operation determines whether user consent is needed for advanced pairing with the selected device at operation 208.

In response to the process determining that user consent is not needed, the process allows advanced pairing operations between the application and the selected device to proceed at operation 210, with the pairing being driven by the application as an in-application advanced pairing user experience. In response to the process determining that user consent is needed, the process invokes a user consent component at operation 212 and determines whether user consent is received at operation 214.

In response to the process determining that user consent is not received, the process proceeds to operation 206 and returns an error message to the application, with the process terminating thereafter. In response to the process determining that user consent is received, the process proceeds to operation 210 and allows the advanced pairing operations to proceed.

Figure 3:
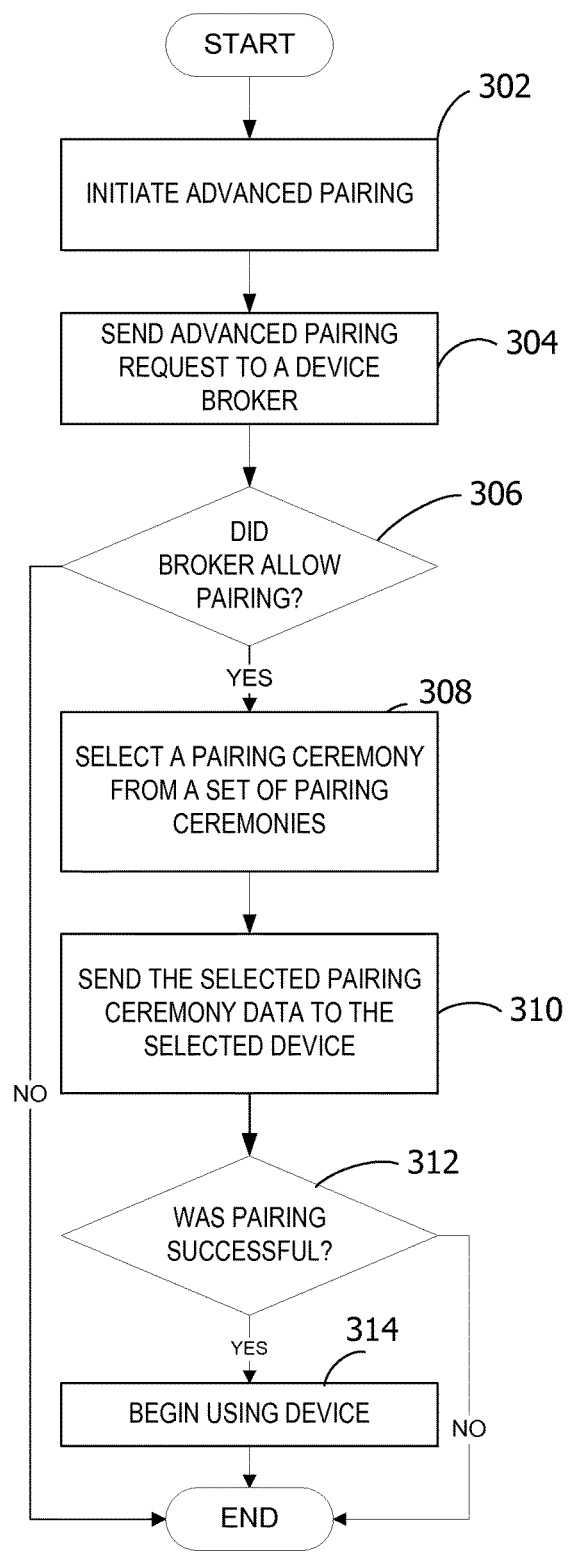
FIG. 3 is an exemplary flowchart illustrating operations performed by the application invoking the broker component.

FIG. 3 is an exemplary flowchart illustrating operations performed by the application invoking the broker component. These operations may be performed by an application, such as application(s) 112 in FIG. 1, for example.

The process begins by initiating advanced pairing at operation 302 by calling an advanced pairing API. The process sends an advanced pairing request to a device broker at operation 304 via the advanced pairing API. The process then determines whether the device broker allowed the pairing request at operation 306 based on a message returned by the device broker to the application. If the process determines that the broker did not allow the pairing, the process terminates.

In response to the process determining that the broker did allow the advanced pairing request, the process then selects a pairing ceremony from a set of pairing ceremonies returned from the device at operation 308. The process sends the selected pairing ceremony data to the selected device at operation 310 to commence pairing. The process determines whether pairing was successful at operation 312 based on messages received from the device broker. If the pairing was not successful, the process terminates. In response to a determination that the pairing was successful, the process beings using the device at operation 314.

The exemplary operations presented in FIG. 2 and FIG. 3 are not intended to provide any limitations on the order or manner of steps or operations implemented by a device broker or broker component, or by an application-driven pairing experience. Any number of suitable alternatives may be performed by the broker component to broker and manage pairing operations for an application.

Figure 4:
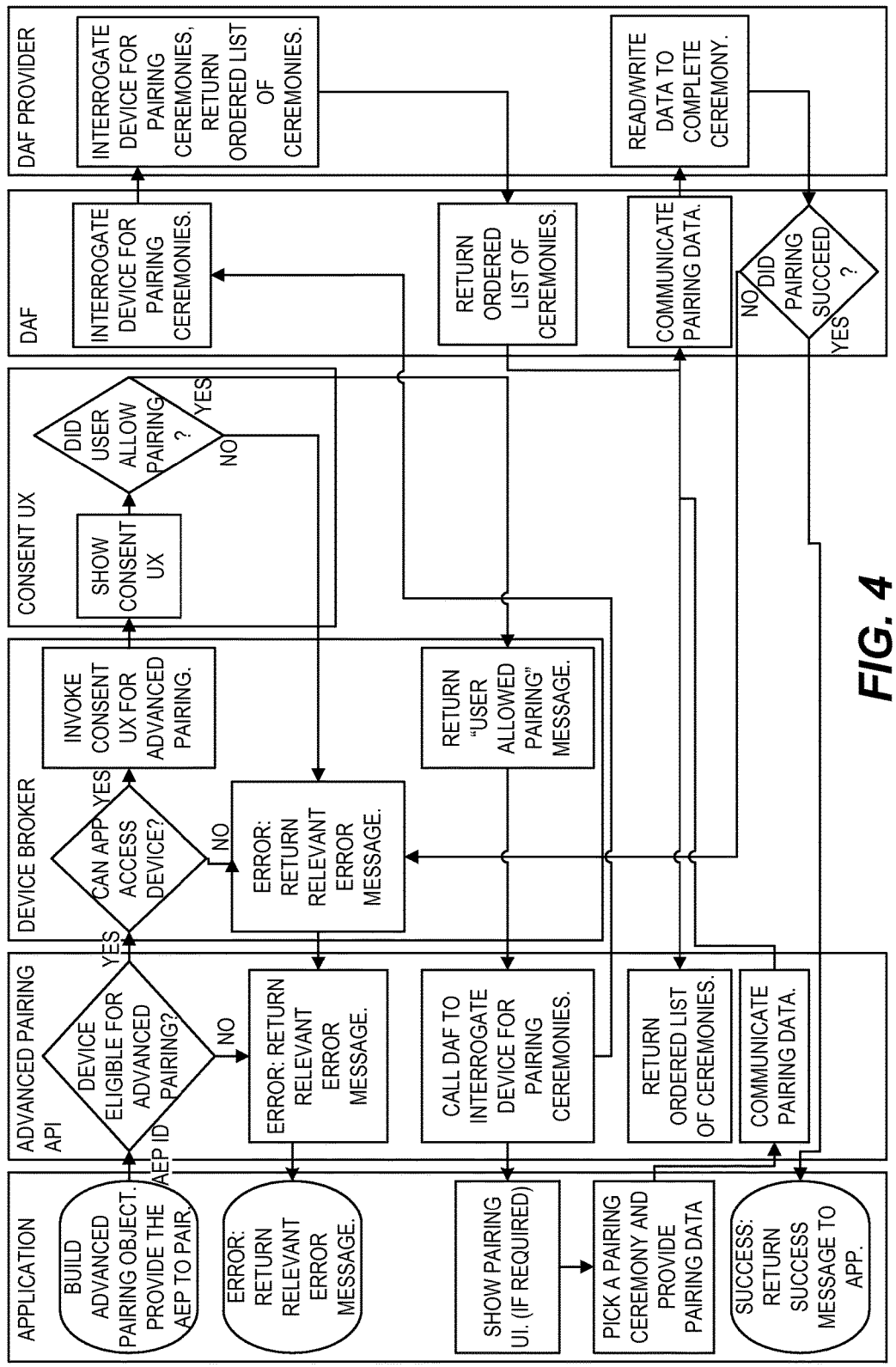
FIG. 4 is an exemplary sequence diagram illustrating brokered advance pairing operations.

Referring next to FIG. 4, an exemplary sequence diagram illustrating brokered advance pairing operations. The brokered advanced pairing operations illustrated in FIG. 4 may be one illustrative scenario performed by one or more components illustrated in FIG. 1, for example, to provide an application-driven advanced pairing experience.

In this illustrative scenario, an application that desires to perform advanced pairing may discover devices, using a runtime device enumeration API in some examples, and select a target device for pairing. The application begins creating the custom pairing experience using an advanced pairing object of the application, which may include the type of types of device to pair and other device identification information. The application may attempt to initiate the advanced pairing operations with a target device by calling the advanced pairing API and passing the advanced pairing object, including the device identification information, to the advanced pairing API.

The advanced pairing API determines if the targeted device is available for advanced pairing and returns and error message to the application if the device is not available. If the device is available for advanced pairing, the advanced pairing API passes the pairing request to the device broker. In these examples, the device broker may determine if the application requesting advanced pairing is able to access the targeted device. The device broker may identify a given policy, such as, without limitation, a system policy, a user policy, an application policy, and so forth, to determine if the application may pair with the targeted device. Decisions by the device broker may be based on application capability declarations, the specific device type or services provided by the targeted device, enterprise group policy, hard coded operating system policy, or any other policy. If the device broker determines further confirmation is needed by the user, the device broker may invoke a consent user interface experience to request user confirmation for the advanced pairing operation.

If the device broker determines that advanced pairing is allowed between the requesting application and the targeted device, either based on a given policy or optionally including a user consent confirmation provided by the consent user interface, the device broker may then return a message to the advanced pairing API indicating that pairing is allowed. The advanced pairing API calls the device association framework (DAF) to interrogate the targeted device for supported pairing ceremonies. The DAF interrogates the targeted device for pairing ceremonies via a DAF provider, such as protocol providers 134 in FIG. 1 for example, which may be a protocol-specific plug-in enabling communication between the DAF and the targeted device. The DAF provider may return an ordered list of ceremonies, which the DAF passes to the requesting application via the advanced pairing API.

The application selects a pairing ceremony from the list of ceremonies obtained by the DAF provider, and communicates pairing data for the selected ceremony via the advanced pairing API to the DAF, which passes the pairing data to the DAF provider to handle read/write data to complete the selected ceremony with the device. The DAF determines whether the pairing was successful and returns a message indicating the success or failure of the advanced pairing operation to the application via the advanced pairing API.

Figure 5:
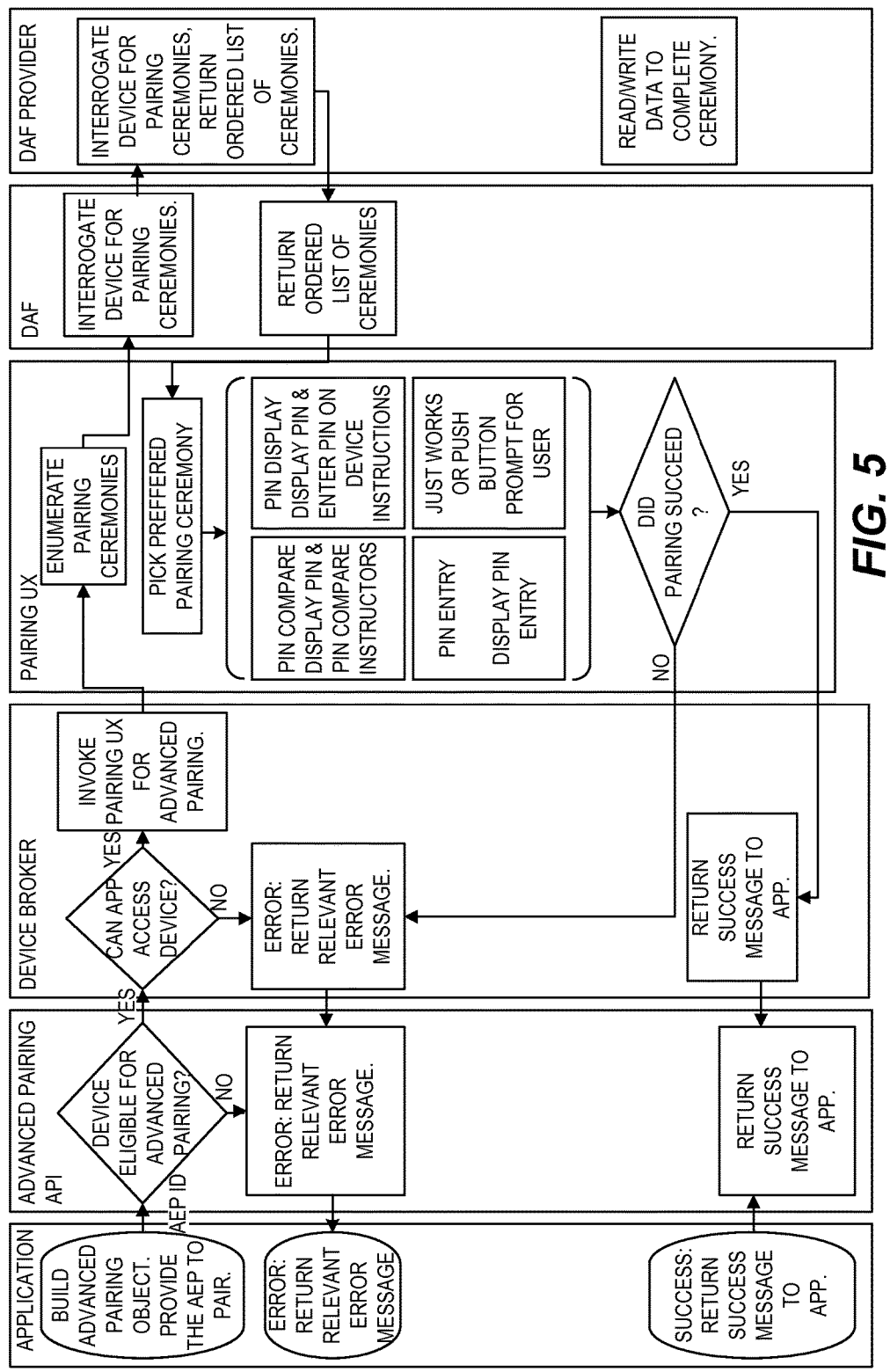
FIG. 5 is an exemplary sequence diagram illustrating brokered basic pairing operations.

Referring next to FIG. 5, an exemplary sequence diagram illustrates brokered basic pairing operations. The brokered basic pairing operations illustrated in FIG. 2 may be one illustrative scenario performed by one or more components illustrated in FIG. 1, for example, when an application selects a basic pairing experience, choosing to hand over control of the pairing user interface to the system and allow the system to select the pairing ceremony.

In this illustrative scenario, the application initiates pairing similar to the process described above for advanced pairing. However, when the device broker determines that the application is requesting basic pairing based on the advanced pairing object passed to the device broker via the advanced pairing API, the device broker invokes a system-controlled pairing experience. In this example of basic pairing, the system component selects the pairing ceremony from the list of ceremonies returned by the DAF and provides the pairing data, returning a message to the application indicating whether the requested pairing succeeded or not.

Figure 6:
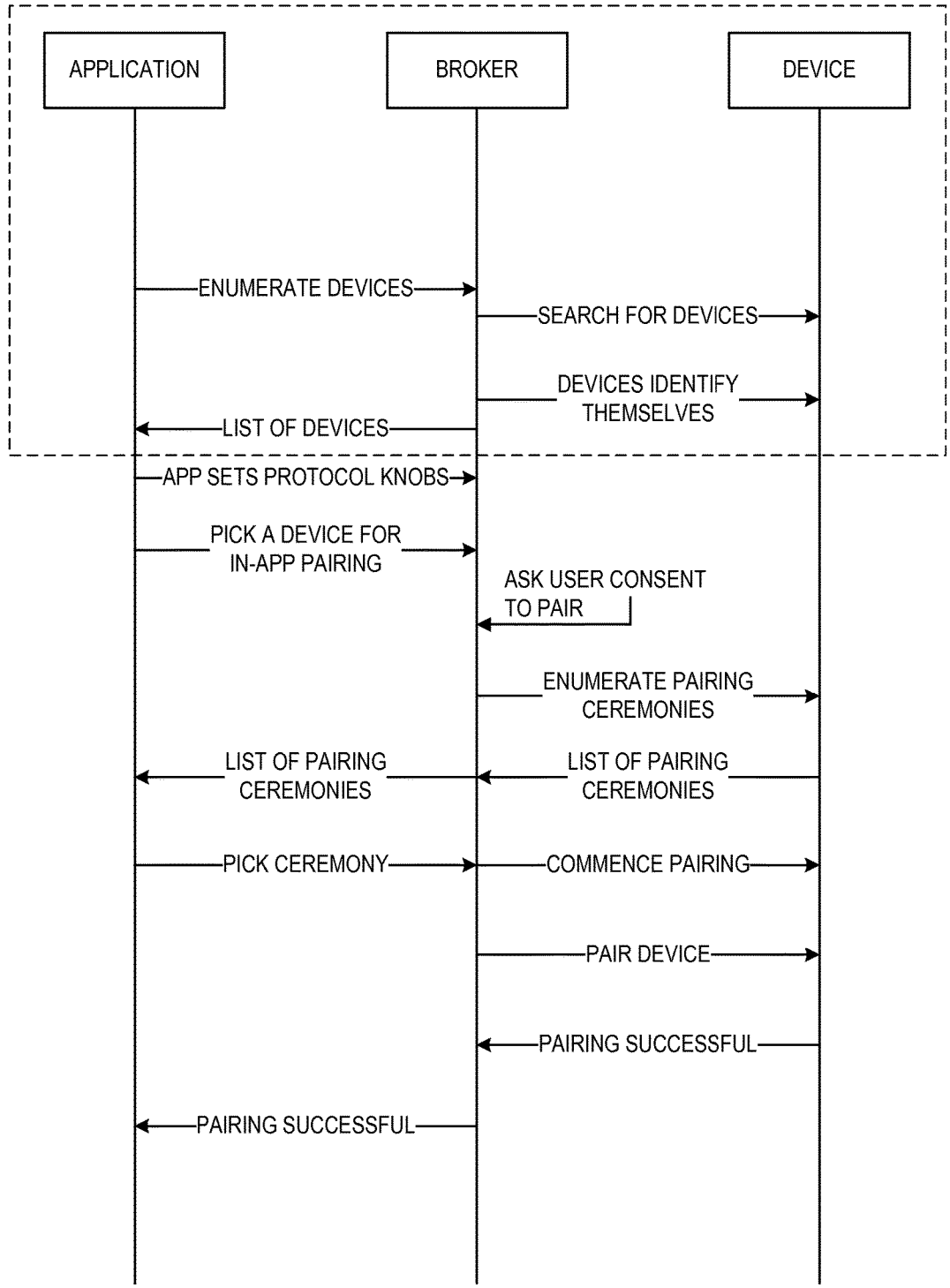
FIG. 6 is an exemplary sequence diagram illustrating advanced pairing operations using a pairing ceremony that does not require data exchange.

FIG. 6 is an exemplary sequence diagram illustrating advanced pairing operations using a pairing ceremony that does not require data exchange. This illustrative scenario may occur when an application selects a pairing ceremony such as JustWorks or push-button ceremony, for example.

In this example, after an application has discovered devices, the application sets protocol knobs and selects a device for in-application pairing, which the device broker (as a system component in this example) receives. Protocol knobs may represent application-specified protocol parameters for a minimum protection level required by the application, in these examples. For example, protocol knobs may include parameters, such as requesting encryption, requesting authentication, or no protocol security at all. The device broker may optionally request user consent for the application to pair with the selected device. The device broker obtains the list of pairing ceremonies from the device for the application and receives the applications selection of a ceremony from the enumerated list of pairing ceremonies to commence pairing. The device broker pairs the device and returns a pairing success message back to the application, so that the application may immediately begin using the device.

Figure 7:
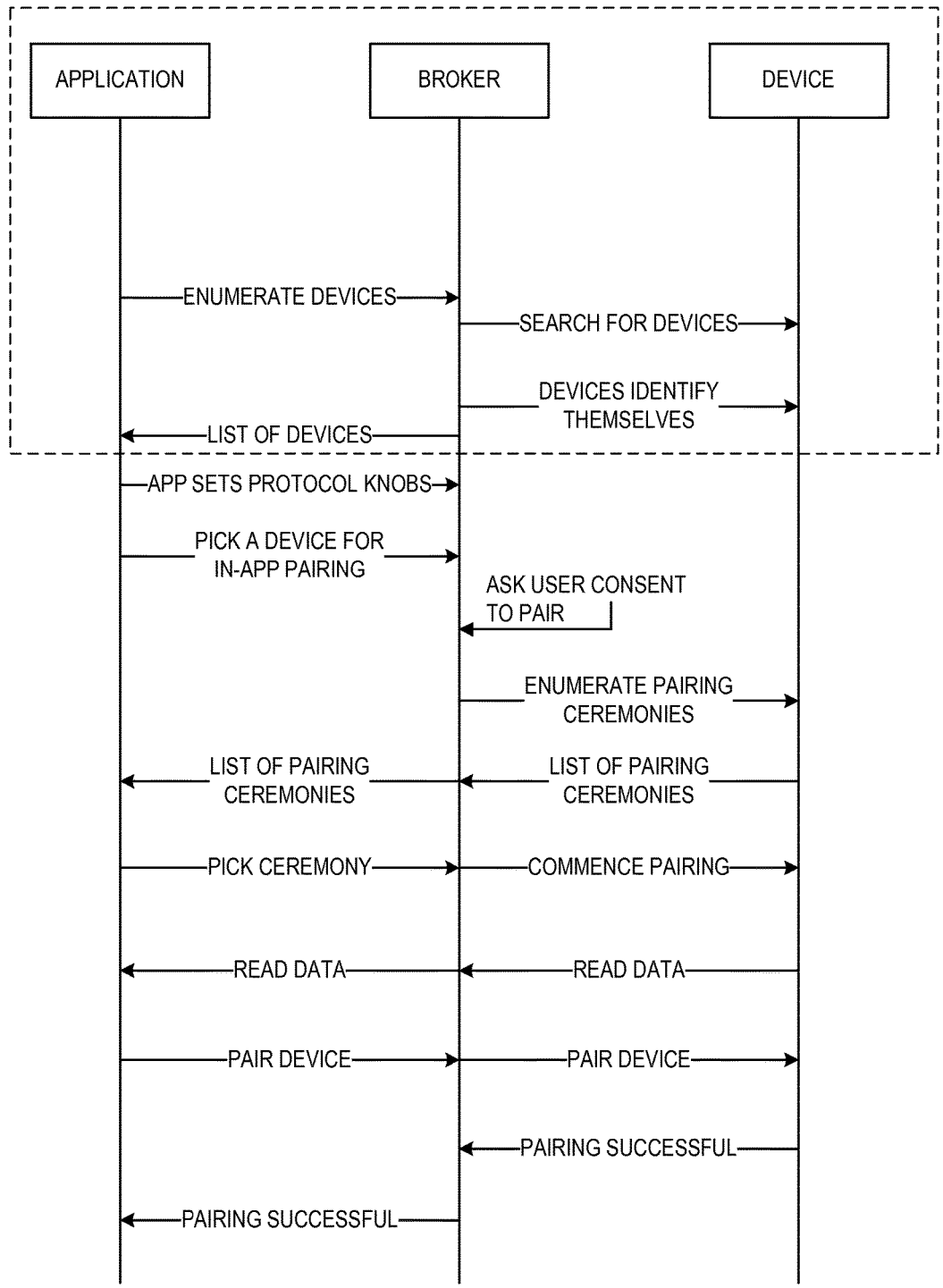
FIG. 7 is an exemplary sequence diagram illustrating advanced pairing operations using a pairing ceremony that includes read data operations.

FIG. 7 is an exemplary sequence diagram illustrating advanced pairing operations using a pairing ceremony that includes read data operations. This illustrative scenario may occur when an application selects a pairing ceremony such as PIN display or PIN compare, for example.

In this example, the application sets protocol-specific parameters, or protocol knobs, and selects a device for in-application pairing, which the device broker (as a system component in this example) receives. The device broker may optionally request user consent for the application to pair with the selected device. The device broker obtains the list of pairing ceremonies from the device for the application and receives the applications selection of a ceremony from the enumerated list of pairing ceremonies to commence pairing, passing read data back to the application from the device to pair the device. The device broker returns a pairing success message back to the application, so that the application may immediately begin using the device.

Figure 8:
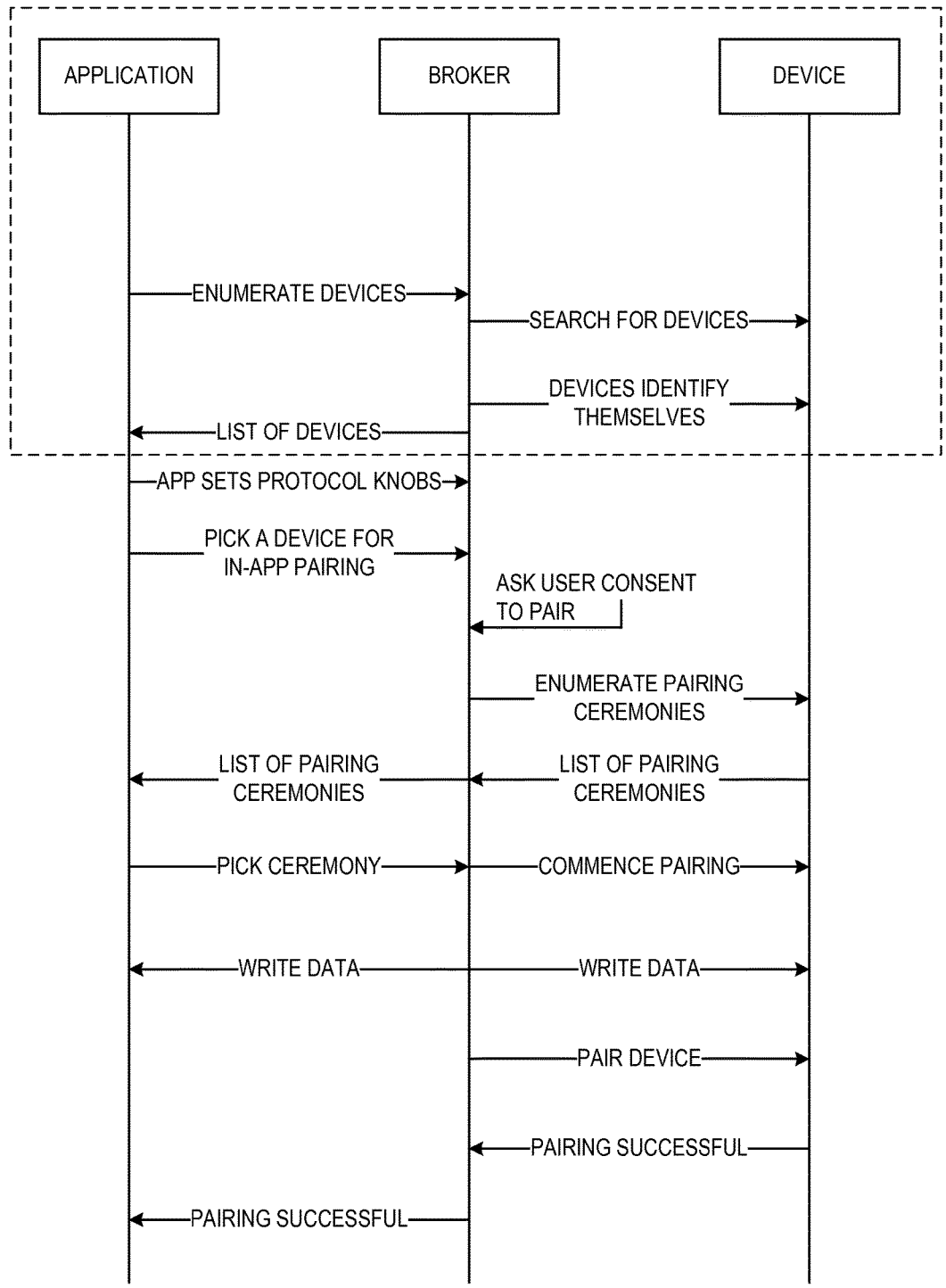
FIG. 8 is an exemplary sequence diagram illustrating advanced pairing operations using a pairing ceremony that includes write data operations

FIG. 8 is an exemplary sequence diagram illustrating advanced pairing operations using a pairing ceremony that includes write data operations. This illustrative scenario may occur when an application selects a pairing ceremony such as PIN entry or credentials entry, for example.

In this example, the application sets protocol-specific parameters, or protocol knobs, and selects a device for in-application pairing, which the device broker (as a system component in this example) receives. The device broker may optionally request user consent for the application to pair with the selected device. The device broker obtains the list of pairing ceremonies from the device for the application and receives the applications selection of a ceremony from the enumerated list of pairing ceremonies to commence pairing, passing write data from the application to the device to pair the device. The device broker returns a pairing success message back to the application, so that the application may immediately begin using the device.

Figure 9:
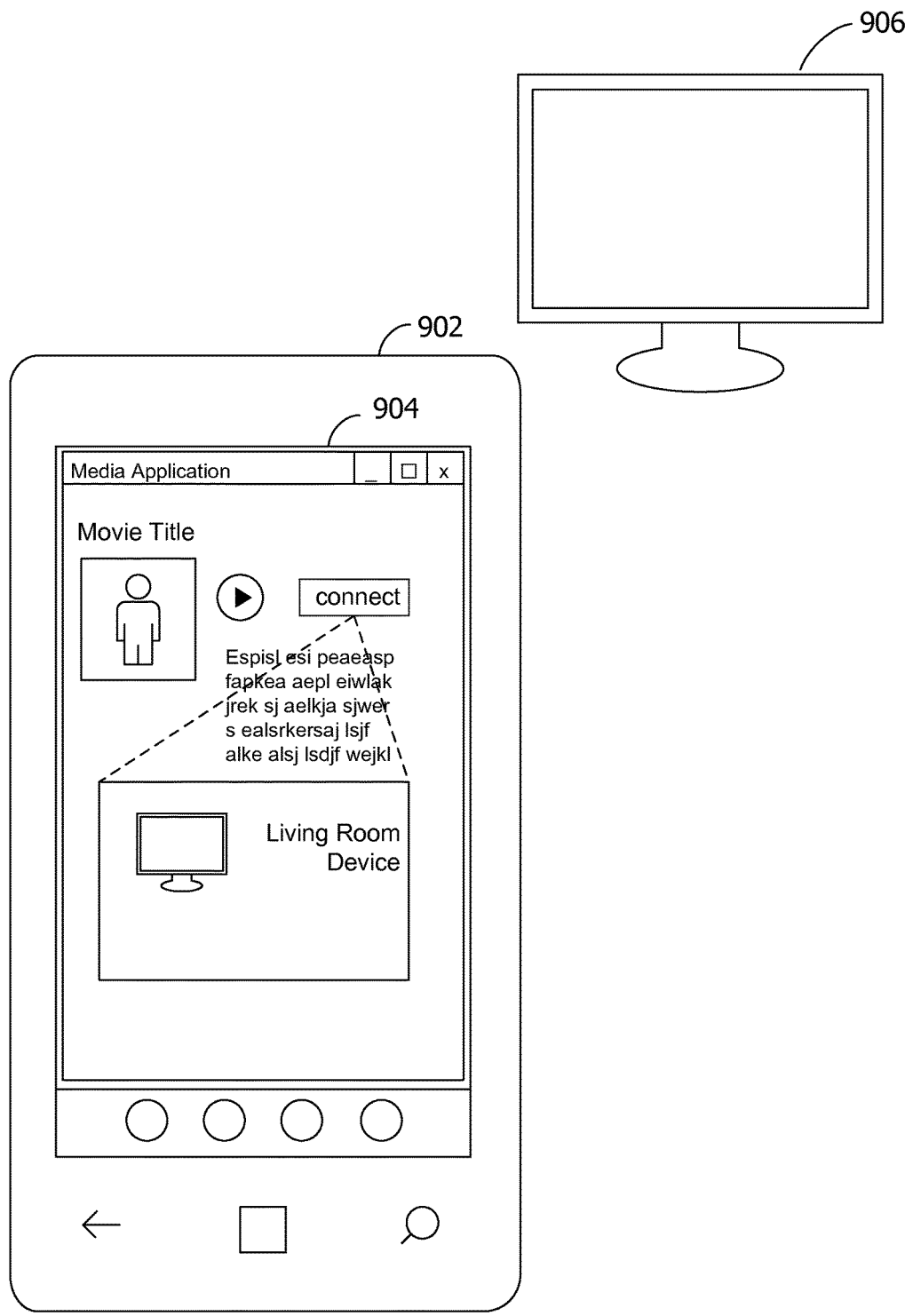
FIG. 9 is an exemplary block diagram illustrating brokered advanced pairing in an application-context user experience.

FIG. 9 is an exemplary block diagram illustrating brokered advanced pairing in an application-context user experience. The example scenario illustrated in FIG. 9 may be one where an application provides an in-application advanced pairing experience.

In this illustrative example, mobile device 902 may be running application 904, which may be a media application in this example. Media application 904 may initiate an in-application advanced pairing experience with device 906, controlling the user interface during the pairing experience such that the user experience remains within the context of the media application, in these examples.

ADDITIONAL EXAMPLES

In some example scenarios, the process described herein may allow the system to provide a user consent prompt, which notifies the user that the application is connecting to the selected device. In these examples, the consent prompt may include the friendly name of the device being paired and provide an option for the user to allow or deny pairing. If the user does not allow pairing, the system does not pair the device and an error is returned to the application, in this example.

In some other examples, the application may tell the advanced pairing API to pair the device using a push button ceremony. For example, the application may provide a user interface button for the user or virtually push the button with a user interface. If the application provides a button, the operating system may recognize the button as pushed during the call to use the push button ceremony, for example.

In additional examples, the application may tell the advanced pairing API to use a PIN entry or PIN display ceremony for pairing. In this example, the application may provide user instructions via an application-driven user interface on how to enter or display the PIN. In these examples, the PIN may be any value, including, without limitation, alphanumerical values, shapes, colors, sounds, images or any other suitable value. The application may send the entered PIN to the advanced pairing API, which in turn hands that data to the device to complete the pairing.

In another example, an application may select multiple devices for advanced pairing. In some examples, if a consent prompt is invoked by the device broker, a user may select which devices to pair from a list of devices the application wants to pair. In other examples, where a consent prompt is not invoked, the application chooses a pairing ceremony for each device and proceeds with providing appropriate pairing data to commence pairing with multiple devices. This illustrative example may occur in a bulk pairing scenario with IoT devices, as one example.

In some other examples, the advanced pairing API may provide a process where an application discovers a device and obtains the advanced pairing object from the device information object. In this example, handlers, or callbacks, for pairing ceremonies the application can support are added to the advanced pairing object and the advanced pairing API and broker component user the handlers as needed for pairing ceremonies the device supports.

In some examples, a requesting application may define a unique or custom pairing ceremony, directing an application-customized ceremony between the application and a selected device. In these examples, the application may implement a custom pairing experience for a user, such as with a custom application user interface, or using QR pairing or cloud pairing capabilities, for example. In other examples, an application may have necessary pairing security data and may be able to complete pairing without involving a user or requiring user interaction during the pairing experience. In some scenarios, only the application may know the pairing security data, such that it is not possible for a user to input the data or for the operating system to drive the pairing ceremony, for example.

Alternatively or in addition to the other examples described herein, examples include any combination of the following:
  a device association framework, including a plurality of
    protocol providers having a plurality of protocol-specific parameters corresponding to pairing protocols, the
    broker component facilitating the device pairing for the
    application via the device association framework;
  an advanced pairing object instantiated by the application;
  an advanced pairing application programming interface;

receive a pairing operation call from the application, including the advanced pairing object instantiated by the application;
generate the pairing request on behalf of the application;
transmit the pairing request to the broker component;
return the advanced pairing object to the application in response to the broker component grating the pairing request;
a set of pairing ceremonies corresponding to the selected device associated with the pairing request, the application selecting a pairing ceremony from the set of pairing ceremonies for the device pairing;
wherein the set of pairing ceremonies include at least one of a push-button ceremony, a personal identification number entry ceremony, a personal identification number display ceremony, a personal identification number compare ceremony, a just works ceremony, or a custom ceremony;
a consent component invoked by the broker component;
generate a user consent request associated with the pairing request;
determine whether user input received in response to the user consent request indicates the device pairing operations are allowed;
in response to determining that the device pairing operations are allowed, allow the broker component to continue the device pairing operations;
in response to determining that the device pairing operations are not allowed, provide an error message to the broker component, the broker component returning the error message to the application;
in response to determining that the application is not able to pair with the selected device, returning an error message to the application via the advanced pairing application programming interface;
identifying one or more policies corresponding to device pairing;
accessing capability declarations for at least one of the application or the selected device;
invoking, by the broker component, a user consent component configured to generate a user consent request and receive user input in response to the user consent request;
in response to receiving an allowed pairing message from the user consent component, continuing the device pairing operations;
in response to receiving a denied pairing message from the user consent component, returning a user denied error message to the application via the advanced pairing application programming interface;
interrogating the selected device for pairing ceremonies via a device association framework;
receiving a set of pairing ceremonies from the selected device;
receiving, from the application, a selected pairing ceremony from the set of pairing ceremonies and pairing data;
communicating the selected pairing ceremony and the pairing data to the selected device;
determining whether device pairing is successful;
in response to determining that the device pairing is successful, return a success message to the application;
in response to determining that the device pairing is not successful, return a device pairing error message to the application;
receiving a set of pairing ceremonies associated with the selected device;
selecting a pairing ceremony from the set of pairing ceremonies;
providing the selected pairing ceremony and pairing data to the advanced pairing application programming interface for communication to the selected device via a device association framework;
generating an application-rendered pairing interface for user selection of the selected pairing ceremony;
receiving the user selection of the selected pairing ceremony from the set of pairing ceremonies;
wherein the advanced pairing application programming interface receives permission from the broker component to call the device association framework to interrogate the selected device for pairing ceremonies, receives the set of pairing ceremonies from the selected device, and provides the set of pairing ceremonies to the application;
wherein the broker component receives the request to initiate the advanced pairing operations and determines whether the application is able to access the selected device based on at least one of one or more policies or capability declarations;
wherein the broker component receives the request to initiate the advanced pairing operations and determines whether to invoke a user consent component.

In some examples, the operations illustrated in FIG. 8-9 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to application data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 10:
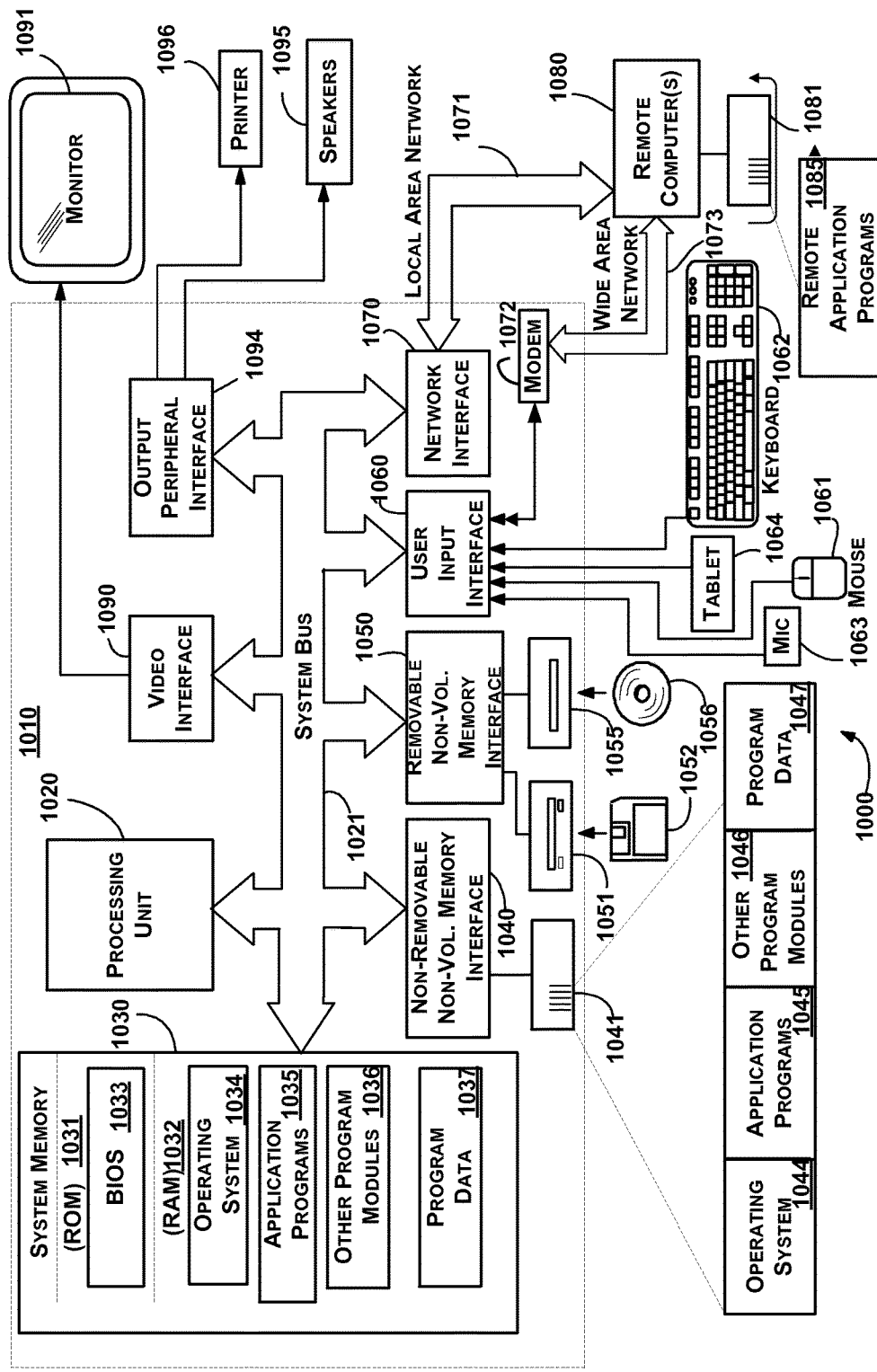
FIG. 10 is an exemplary block diagram illustrating an operating environment for a computing device implementing an audio routing component.

FIG. 10 illustrates an example of a suitable computing and networking environment 1000 on which the examples of FIG. 1 may be implemented. The computing system environment 1000 is only one example of a suitable computing environment and is not intended to suggest any limitation as to the scope of use or functionality of the disclosure. Neither should the computing environment 1000 be interpreted as having any dependency or requirement relating to any one or combination of components illustrated in the exemplary operating environment 1000.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the disclosure may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media may be any available media that may be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 1031 and 1032 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 1010. Computer storage media does not, however, include propagated signals. Rather, computer storage media excludes propagated signals. Any such computer storage media may be part of computer 1010.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components may either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel may be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

The examples illustrated and described herein as well as examples not specifically described herein but within the scope of aspects of the disclosure constitute exemplary means for brokered advance pairing. For example, the elements illustrated in FIG. 1, such as when encoded to perform the operations illustrated in FIG. 2-3, constitute exemplary means for application-driven advanced pairing operations.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for brokered device pairing, the system comprising:
   at least one processor; and
   a memory comprising computer program code and communicatively coupled to the at least one processor, the computer program code comprising;
   an untrusted application executable by the at least one processor; and
   a broker component executable by the at least one processor and configured to:
      receive a pairing request from the untrusted application to pair with a selected device other than the system; and
      manage device pairing operations between the untrusted application executing at the system and the selected device via an application-driven user interface, including providing device protocol information to the untrusted application and receiving device pairing instructions from the untrusted application.

2. The system of claim 1, further comprising:
   a device association framework, including a plurality of protocol providers having a plurality of protocol-specific parameters corresponding to pairing protocols, the broker component facilitating the device pairing for the application via the device association framework.

3. The system of claim 1, further comprising:
   an advanced pairing object instantiated by the untrusted application; and
   an advanced pairing application programming interface configured to:
      receive a pairing operation call from the untrusted application, including the advanced pairing object instantiated by the untrusted application;
      generate the pairing request on behalf of the untrusted application; and
      transmit the pairing request to the broker component.

4. The system of claim 3, wherein the advanced pairing application programming interface is further configured to:
   return the advanced pairing object to the untrusted application in response to the broker component grating the pairing request.

5. The system of claim 1, further comprising:
   a set of pairing ceremonies corresponding to the selected device associated with the pairing request, the untrusted application selecting a pairing ceremony from the set of pairing ceremonies for the device pairing.

6. The system of claim 5, wherein the set of pairing ceremonies include at least one of a push-button ceremony, a personal identification number entry ceremony, a personal identification number display ceremony, a personal identification number compare ceremony, a just works ceremony, or a custom ceremony.

7. The system of claim 1, further comprising:
a consent component invoked by the broker component and configured to:
  generate a user consent request associated with the pairing request;
  determine whether user input received in response to the user consent request indicates the device pairing operations are allowed; and
  in response to determining that the device pairing operations are allowed, allow the broker component to continue the device pairing operations.

8. The system of claim 7, further comprising:
in response to determining that the device pairing operations are not allowed, provide an error message to the broker component, the broker component returning the error message to the untrusted application.

9. A method for brokered advanced pairing, the method comprising:
receiving, by a broker component at a computing device, a pairing request from an untrusted application at the computing device via an advanced pairing application programming interface to pair with a selected device;
determining whether the untrusted application at the computing device is able to pair with the selected device; and
in response to determining that the untrusted application is able to pair with the selected device, initiating device pairing operations with the selected device on behalf of the untrusted application at the computing device.

10. The method of claim 9, further comprising:
in response to determining that the untrusted application is not able to pair with the selected device, returning an error message to the untrusted application via the advanced pairing application programming interface.

11. The method of claim 9, wherein determining whether the application is able to pair with the selected device further comprises:
identifying one or more policies corresponding to device pairing; and
accessing capability declarations for at least one of the untrusted application or the selected device.

12. The method of claim 11, wherein at least one of the one or more policies corresponding to the device pairing include a user confirmation command, further comprising:
invoking, by the broker component, a user consent component configured to generate a user consent request and receive user input in response to the user consent request;
in response to receiving an allowed pairing message from the user consent component, continuing the device pairing operations; and
in response to receiving a denied pairing message from the user consent component, returning a user denied error message to the untrusted application via the advanced pairing application programming interface.

13. The method of claim 9, further comprising:
interrogating the selected device for pairing ceremonies via a device association framework;
receiving a set of pairing ceremonies from the selected device;
receiving, from the untrusted application, a selected pairing ceremony from the set of pairing ceremonies and pairing data;
communicating the selected pairing ceremony and the pairing data to the selected device; and
determining whether device pairing is successful.

14. The method of claim 13, further comprising:
in response to determining that the device pairing is successful, return a success message to the untrusted application; and
in response to determining that the device pairing is not successful, return a device pairing error message to the untrusted application.

15. One or more computer storage media having computer-executable instructions, which on execution by a computer cause the computer to perform operations comprising:
instantiating, by an untrusted application at a computing device, an advanced pairing object having a selected device to pair; and
sending a request to a broker component at the computing device to initiate advanced pairing operations between the untrusted application at the computing device and the selected device via an advanced pairing application programming interface using the advanced pairing object.

16. The one or more computer storage media of claim 15, having further computer-executable instructions comprising:
receiving a set of pairing ceremonies associated with the selected device;
selecting a pairing ceremony from the set of pairing ceremonies; and
providing the selected pairing ceremony and pairing data to the advanced pairing application programming interface for communication to the selected device via a device association framework.

17. The one or more computer storage media of claim 16 having further computer-executable instructions comprising:
generating an application-rendered pairing interface for user selection of the selected pairing ceremony; and
receiving the user selection of the selected pairing ceremony from the set of pairing ceremonies.

18. The one or more computer storage media of claim 16, wherein the advanced pairing application programming interface receives permission from the broker component to call the device association framework to interrogate the selected device for pairing ceremonies, receives the set of pairing ceremonies from the selected device, and provides the set of pairing ceremonies to the application.

19. The one or more computer storage media of claim 15, wherein the broker component receives the request to initiate the advanced pairing operations and determines whether the application is able to access the selected device based on at least one of one or more policies or capability declarations.

20. The one or more computer storage media of claim 15, wherein the broker component receives the request to initiate the advanced pairing operations and determines whether to invoke a user consent component.

* * * * *